United States Patent
Anderson et al.

(10) Patent No.: US 12,539,073 B1
(45) Date of Patent: Feb. 3, 2026

(54) APPARATUS AND METHOD FOR THE DETERMINATION OF ENDOTHELIAL DYSFUNCTION AND SEPSIS RISK USING NITRIC OXIDE CONCENTRATIONS IN EXHALED BREATH

(71) Applicant: Vail Scientific, Inc., Inver Grove Heights, MN (US)

(72) Inventors: Carter R. Anderson, Inver Grove Heights, MN (US); Russell L. Morris, Lindstrom, MN (US); Thomas W. Burke, Plymouth, MN (US); Clayton J. Anderson, Lakeville, MN (US)

(73) Assignee: Vail Scientific, Inc., Inver Grove Heights, MN (US)

( * ) Notice: Subject to any disclaimer, the term of this patent is extended or adjusted under 35 U.S.C. 154(b) by 366 days.

(21) Appl. No.: 17/342,739

(22) Filed: Jun. 9, 2021

Related U.S. Application Data (60) Provisional application No. 63/037,136, filed on Jun. 10, 2020.

(51) Int. Cl.
*A61B 5/00* (2006.01)
*A61B 5/0205* (2006.01)
(Continued)

(52) U.S. Cl.
CPC .......... *A61B 5/412* (2013.01); *A61B 5/02055* (2013.01); *A61B 5/082* (2013.01);
(Continued)

(58) Field of Classification Search
None
See application file for complete search history.

(56) References Cited

U.S. PATENT DOCUMENTS 5,447,165 A * 9/1995 Gustafsson ............ A61B 5/411
600/532
5,767,103 A * 6/1998 Greenberg ........... A61K 31/714
514/52

(Continued)

FOREIGN PATENT DOCUMENTS

BE         1020244 A3 *  7/2013  ............. A61B 5/082
WO    WO-03084388       *  4/2002

OTHER PUBLICATIONS

J ten Oever et al.2013 J. Breath Res. 7 036003 (Year: 2013).*

(Continued)

*Primary Examiner* — Tse W Chen
*Assistant Examiner* — Martin Nathan Ortega
(74) *Attorney, Agent, or Firm* — Dorsey & Whitney LLP (57) ABSTRACT

A method for determining a risk of sepsis in a patient is disclosed. The method includes collecting an exhaled breath sample, determining a NO concentration in the exhaled breath sample; and determining a sepsis risk score correlated to the NO concentration, wherein the sepsis risk score is indicative of a risk of a patient having or developing sepsis. The method may further include determining an additional measurement of the patient's vital statistics including one or more of: end tidal $CO_2$, respiratory rate, pulse rate, body temperature, cognitive assessment score, systolic blood pressure, diastolic blood pressure, or hemoglobin oxygen saturation level, and further determining the sepsis risk score based on the additional measurement.

24 Claims, 7 Drawing Sheets

(51) Int. Cl.
  *A61B 5/08* (2006.01)
  *A61B 10/00* (2006.01)
  *G01N 33/497* (2006.01)
  *G16H 50/20* (2018.01)
  *G16H 50/30* (2018.01)

(52) U.S. Cl.
  CPC ............ *A61B 5/4088* (2013.01); *A61B 10/00* (2013.01); *G01N 33/497* (2013.01); *G16H 50/20* (2018.01); *G16H 50/30* (2018.01); *A61B 2010/0087* (2013.01); *A61B 2560/02* (2013.01); *G01N 33/4975* (2024.05)

(56) References Cited

U.S. PATENT DOCUMENTS

| | | | |
|---|---|---|---|
| 10,058,269 B2* | 8/2018 | Lynn | A61B 5/0871 |
| 2004/0162500 A1* | 8/2004 | Kline | A61B 10/0045 600/543 |
| 2007/0240987 A1* | 10/2007 | Nair | G01N 33/497 204/426 |
| 2012/0203126 A1* | 8/2012 | Kahlman et al. | A61B 5/412 600/532 |
| 2015/0024969 A1* | 1/2015 | Langley | G01N 33/6848 506/15 |
| 2017/0184564 A1* | 6/2017 | Liu | G01N 33/497 |
| 2017/0325749 A1* | 11/2017 | Shah | A61B 5/7275 |
| 2020/0337594 A1* | 10/2020 | Reddy | G01N 33/57423 |

OTHER PUBLICATIONS

Lundberg JO, Weitzberg E, Lundberg JM, Alving K. Nitric oxide in exhaled air. Eur Respir J. Dec. 1996;9(12):2671-80 (Year: 1996).*

Q. Yang, H. Yin, T. Xu, D. Zhu, J. Yin, Y. Chen, X. Yu, J. Gao, C. Zhang, Y. Chen, Y. Gao, Engineering 2D Mesoporous Silica@ MXene-Integrated 3D-Printing Scaffolds for Combinatory Osteosarcoma Therapy and NO-Augmented Bone Regeneration. Small 2020, 16, 1906814. https://doi.org/10.1002/smll.201906814 (Year: 2020).*

Silkoff, et al., "Marked Flow-Dependence of Exhaled Nitric Oxide Using A New Technique to Exclude Nasal Nitric Oxide", American Journal of Respiratory and Critical Care Medicine, vol. 155, pp. 260-267, Feb. 1997.

Winkler, et al., "Symmetrical (SDMA) and Asymmetrical Dimethylarginine (ADMA) in Sepsis: High Plasma Levels as Combined Risk Markers for Sepsis Survival", Critical Care, vol. 22(1), 216, Sep. 19, 2018, London, England.

Soop, et al., "Exhaled NO and plasma cGMP increase after endotoxin infusion in healthy volunteers", Eur Respir J; vol. 21, 2003, pp. 594-599.

Stitt, et al., "Exhalation of gaseous nitric oxide by rats in response to endotoxin and its absorption by he lungs", J. Appl. Physiol.; vol. 82, No. 1, 1997, pp. 305-316.

Sartelli, et al., "Raising concerns about the Sepsis-3 definitions", World J. of Emergency Surgery; 13 (2018): pp. 1-9.

\* cited by examiner

| Subject | NO (PPB) 3pts<10, 3pts>25 | Body Temp (degF) 4pts>100.4, 1pts<96.8 | Sepsis Diagnosis (Y+/N-) | Score |
|---|---|---|---|---|
| S004 | 5 | 102.1 | + | 7 |
| S014 | 5 | 102 | - | 7 |
| S012 | <5 | 103.3 | + | 7 |
| S020 | 7 | 102.7 | - | 7 |
| S010 | 18 | 102.7 | + | 4 |
| S001 | 26 | 96 | + | 4 |
| S002 | 6 | 100.1 | - | 3 |
| S017 | 37 | 99.5 | + | 3 |
| S006 | 5 | 98.4 | - | 3 |
| S018 | 6 | 98.9 | + | 3 |
| S023 | 19 | 98 | - | 0 |
| S009 | 21 | 97.7 | - | 0 |
| S013 | 19 | 97.2 | - | 0 |
| S008 | 12 | 98.2 | - | 0 |
| S015 | 12 | 98.7 | - | 0 |
| S019 | 21 | 98.4 | - | 0 |

FIG. 7

APPARATUS AND METHOD FOR THE DETERMINATION OF ENDOTHELIAL DYSFUNCTION AND SEPSIS RISK USING NITRIC OXIDE CONCENTRATIONS IN EXHALED BREATH

CROSS REFERENCE TO RELATED APPLICATIONS

This application claims the benefit of priority pursuant to 35 U.S.C. § 119 (e) of U.S. provisional patent application No. 63/037,136, filed 10 Jun. 2020, entitled "Apparatus and Method for the Determination of Endothelial Dysfunction and Sepsis Risk Using Nitric Oxide Concentrations in Exhaled Breath," which is hereby incorporated by reference herein in its entirety.

FIELD

The disclosed processes, methods, devices, and systems are directed to accurate and reliable diagnosis of conditions associated with systemic bacterial infections, such as sepsis and risk of developing same.

BACKGROUND

Every year, severe sepsis strikes more than a million Americans. It is estimated that between 28 and 50 percent of these people die, more than the number from prostate cancer, breast cancer, and AIDS combined. The Agency for Healthcare Research and Quality lists sepsis as the most expensive condition treated in U.S. hospitals, costing more than $20 billion in 2011.

Sepsis and septic shock is a serious medical condition caused by an overwhelming immune response to infection. Early diagnosis of sepsis has been shown to increase patient survival via appropriate treatment and decrease hospital stay/costs. Unfortunately, the currently available methods for diagnosing sepsis rely on detection of symptoms that only become evident after the infection has progressed to dangerous levels. It has been estimated that as many as 80% of lives lost to sepsis could be saved if a device for more rapid analysis was available.

Another problem associated with sepsis diagnosis results in potential for 'over' diagnosis, where patients are treated for sepsis despite not actually having it. Current methods for rapid diagnosis of sepsis, using the quick Sequential Organ Failure Assessment (qSOFA) method, for example, can result in patients being administered antibiotics when they do not actually need them. The qSOFA score relies on assessing three different criteria—mentation, respiratory rate, and blood pressure. While the qSOFA score may be rapidly calculated at the patient's bedside, it does not directly detect nor assess the presence of microbes in the blood. A recent publication suggests that 56.7% of antibiotics administered to ER patients meeting qSOFA criteria are inappropriate. Another proposed non-invasive screening tool for sepsis is a PRESEP score, which includes a calculation based on patient's heart rate, respiratory rate, body temperature, satO2, and systolic blood pressure. While the PRESEP score is helpful, it likewise is deficient when it comes to identifying actual infection in a patient. For example, a PRESEP score may misidentify a patient as having sepsis when they actually have heat stroke or a pulmonary embolism.

There have been many attempts to characterize sepsis risk in a patient by assessment of various biomarkers in a blood sample. For example, US application 2018/0291449 proposes use of a panel of blood biomarkers for use to distinguish sepsis from non-infectious sources of inflammation. However, blood tests are 'invasive' tests that require a sample be drawn from a patient and sent to a lab, and typically the biomarker measurement involves the user of a sophisticated bench-top analysis instrument.

There would be advantage in speed to assessment of sepsis if a point of care device could be devised. Such a method would eliminate the time involved in sending a sample to a hospital laboratory. Patent application 2018/0180589 describes a device and method where a blood sample could be collected and analyzed at a remote 'point of care' location. However, most proposed point of care methods still require blood sampling and sophisticated chemical analysis of the collected blood.

The overproduction of nitric oxide (NO) during sepsis is possibly the most important cause of the vasopressor-resistant hypotension that characterizes septic shock. Consequently, efforts have been undertaken to develop methods for analysis of NO and nitrosothiols in drawn blood samples as a means to detect the onset of sepsis in at-risk patients. A significant limitation to this approach rests in the instability of NO in the blood and resulting short half-life. Others have investigated use of sensors placed directly into the blood stream to detect NO. Using this technique in pre-clinical animal testing, the relationship between blood concentrations of NO and the onset of sepsis has been confirmed in a murine pneumonia model. However, this approach requires an invasive blood measurement that would be prone to significant limitations (instability, calibration drift, difficulty in placement, etc.).

In contrast to the expectation that overproduction of nitric oxide is the primary causal factor in sepsis complications, there is also seemingly contradictory evidence that inhibitors of the NOS pathway may contribute to sepsis complications that lead to organ failure and death. These theories are based, not on measurements of NO, directly, but on indirect measurements of inhibitors of various parts of the nitric oxide pathway—specifically symmetric dimethylarginine (SDMA; uptake inhibitor of the NO-precursor L-arginine) and asymmetric dimethylarginine (ADMA; a competitive inhibitor of nitric oxide synthase). (See, Winkler et al., "*Symmetrical (SDMA) and asymmetrical dimethylarginine (ADMA) in sepsis: high plasma levels as combined risk markers for sepsis survival*," Critical Care, 2018, Vol. 22, page 216). Such indirect measurements require invasive blood sampling and complex laboratory based analytical methods, and therefore are less than ideal for settings such as the ICU. Study authors conceded that direct measurement of NO is the "gold standard for analysis of NO metabolism," but lament that such a method "currently seems impossible." Id.

There is value in obtaining a non-invasive specimen for determining levels of biomarkers for disease states. Cutaneous and transcutaneous measurements for NO have been proposed for noninvasive sepsis diagnosis. In application 2018/002094, a non-invasive system and method to detect nitric oxide concentration in skin is described for detecting a sepsis condition. However, such a method may be unreliable owing to the fact nitric oxide can be generated in skin at varying levels in healthy, non-septic individuals as a result of simple environmental temperature change, thus confounding the analysis. Application WO 2017023500 proposes a transcutaneous measurement for NO and other blood gases for the noninvasive diagnosis of sepsis. However, as noted above, NO can be generated in skin for reasons related to temperature change rather than sepsis, and transcutaneous measurements of other blood gases are known to be temperature sensitive as well. Thus, both cutaneous and transcutaneous measurements are susceptible to error.

Another approach to noninvasive NO measurement is via gases measured in exhaled breath. In animal models, high concentrations of NO in exhaled breath have been successfully correlated to artificially induced sepsis caused by the administration of endotoxins. However, subsequent evaluations of humans with actual septic shock indicated that higher concentrations of NO in exhaled breath only correlated with respiratory derived sepsis infections, and did NOT correlate with non-respiratory derived sepsis infections. [See, e.g., J ten Oever, et al., *Pulmonary infection, and not systemic inflammation, accounts for increased concentrations of exhaled nitric oxide in patients with septic shock*, 7 no. 3, J. Breath Res. (September 2013)]. Consequently, "false negatives" would result from testing of septic patients with non-respiratory derived sepsis. Further, in this study NO concentrations did not correlate with markers of sepsis disease severity, systemic inflammation and hemodynamic instability. Additionally, high NO concentration in exhaled breath can also be impacted by non-sepsis medical conditions such as asthma or COPD, or patient habits such as smoking, intake of anti-inflammatory medications, increasing the potential for false positives or false negatives.

Thus to date, exhaled breath NO measurements have proven inadequate for the successful diagnosis of sepsis, and no devices have been FDA approved for such an assessment. There continues to exist a need for a fast, reliable, and non-invasive measurement for sepsis detection and risk assessment.

SUMMARY

A method and device for determining a risk of sepsis in a patient is disclosed. The method includes collecting an exhaled breath sample, determining a NO concentration in the exhaled breath sample; and determining a sepsis risk score correlated to the NO concentration, wherein the sepsis risk score is indicative of a risk of a patient having or developing sepsis. The method may further include determining an additional measurement of the patient's vital statistics including one or more of: end tidal $CO_2$, respiratory rate, pulse rate, body temperature, cognitive assessment score, systolic blood pressure, diastolic blood pressure, or hemoglobin oxygen saturation level, and further determining the sepsis risk score based on the additional measurement.

In some embodiments, an NO concentration higher than about 25 ppb, or lower than about 10 ppb is correlated to an elevated sepsis risk score. The exhaled breath sample may be collected for a controlled duration and/or at a controlled rate.

In some embodiments, the method may include collecting a second exhaled breath sample at a time after collecting the exhaled breath sample; determining a second NO concentration in the second exhaled breath sample; and determining a second sepsis risk score correlated to the second NO concentration.

In some embodiments, the method may include determining a changed sepsis risk score based on a difference between the sepsis risk score and the second sepsis risk score; and determining an improvement or a worsening of a sepsis condition in the patient based on the changed sepsis risk score.

In some embodiments, the method may include determining a changed NO concentration by subtracting the second NO concentration from the NO concentration. An improvement in a sepsis condition in the patient may be correlated to a negative changed NO concentration, for example, when at least one of the NO concentration or the second NO concentration is below about 10 ppb or correlated to a positive changed NO concentration, for example, when at least one of the NO concentration or the second NO concentration is above about 25 ppb. A worsening in a sepsis condition in the patient may be correlated to a negative changed NO concentration, for example, when at least one of the NO concentration or the second NO concentration is above about 25 ppb, or correlated to a positive changed NO concentration, for example, when at least one of the NO concentration or the second NO concentration is below about 10 ppb.

A sepsis assessment device according to one embodiment includes a fluid input in fluid communication with a respiratory tract of a patient, wherein the fluid input receives an exhaled breath from the patient; a NO measurement device that determines a NO concentration in the exhaled breath; an input/output interface; a processing element in electrical communication with the NO measurement devices and the input/output interface. The processing element receives a first signal corresponding to the NO concentration; determines a sepsis risk score based on the first signal; and transmits the sepsis risk score to the input/output interface. In some embodiments, the device may measure one of controlled rate NO and end-tidal NO.

DETAILED DESCRIPTION

Disclosed herein is an improved non-invasive and invasive method and devices to aid in predicting the possibility of sepsis in a human patient at risk for having or developing sepsis. The disclosed devices and methods may also aid in predicting the risk of progression of sepsis to severe sepsis and/or septic shock in a human patient. An elevated sepsis risk score may be indicative of a risk of septic shock or mortality.

In one embodiment of this disclosure, applicants' methods and devices provide for the measurement of nitric oxide (NO) in exhaled breath to aid in assessing sepsis risk.

Disclosed in application Ser. No. 16/381,960 are techniques to assess and control the way the exhaled breath NO sample is collected for sepsis assessment. In a preferred approach, the assessment of NO levels in exhaled breath is determined after the patient exhales in a controlled manner. For example, in most embodiments the patient preferably exhales at slower rate and, therefore, for a longer time than for other methods.

Concentrations of nitric oxide measured in exhaled breath are dependent on the rate that breath is exhaled. Nitric oxide is picked up in exhalations from the airway walls; and the slower the rate of exhalation the greater the amount of nitric oxide will be picked up. An example of a reference which illustrates this flow rate dependence is titled "*Marked Flow—Dependence of Exhaled Nitric Oxide Using a New Technique to Exclude Nasal Nitric Oxide by Silkoff et al and published in AM J RESPIR CRIT CARE MED* 1997; 155: 260-267' which is incorporated herein by reference for all purposes. For purposes of illustration in the present application, unless otherwise noted, nitric oxide values will be shown as those which would be measured at a 50 ml/sec exhale breath rate. These values can be converted to expected values from other exhale breath rates by using equation 1, below.

$$\text{Measured nitric oxide} = 208.6795 \times (\text{flow rate in ml/sec})^{-0.5995} \qquad (1)$$

For example, a measurement of 20 ppb nitric oxide at 50 ml/sec exhaled breath rate would equate to a measurement of ~30 ppb nitric oxide at 25 ml/sec exhaled breath rate. Applicants have discovered that this slow, controlled rate allows for more accurate identification of the concentration of NO in the fraction of exhaled breath that has been in closest contact with lung tissue affected by sepsis. We have discovered that an optimal exhale rate is preferably between 20 mL/sec and 50 mL/sec.

The exhaled breath is collected and measured for nitric oxide concentrations. For the purposes of the methods disclosed herein, collection can mean exhaled breath going directly into a device for measurements, or alternatively the exhaled breath can be dispensed into a suitable container for later testing.

The nitric oxide measuring devices of this disclosure may measure NO in exhaled breath using electrochemical or spectroscopic sensing means. Such sensing methods are well known to those skilled in the art, and currently utilized in separate devices for different clinical purposes. An example of an NO detector or measurement device is the NIOX® VERO supplied by Circassia Pharmaceuticals, Inc. Another example of an NO detector is Eco Medics CLD 88 sp Nitric Oxide analyzer.

In the methods disclosed herein, a positive sepsis diagnosis may occur when a NO concentration falls above or below certain ranges, for example ranges for associated with healthy individuals. For example, sepsis risk may be high when exhaled nitric oxide concentrations are greater than about 25 parts per billion (ppb) concentration OR a nitric oxide concentration is below about 10 ppb. In many embodiments a patient may be determined to have sepsis wherein the patient has an average controlled rate exhaled nitric oxide reading of greater than about 25 ppb, 26 ppb, 27 ppb, 28 ppb, 29 ppb, 30 ppb, 31 ppb, 32 ppb, 33 ppb, 34 ppb, 35 ppb, 36 ppb, 37 ppb, 38 ppb, 39 ppb, 40 ppb, 45 ppb, 50 ppb, OR a reading that is below about 13 ppb, 12 ppb, 11 ppb, 10 ppb, 9 ppb, 8 ppb, 7 ppb, 6 ppb, 5 ppb, or 4 ppb.

It is also contemplated that methods disclosed herein can be used to monitor patients for worsening or improving conditions as they relate to sepsis. When used for this purpose, multiple readings are taken over time to determine if a sepsis patient's nitric oxide concentrations are trending toward (e.g. improving) or away from (e.g. worsening) concentrations of nitric oxide that are associated with a healthy normal range.

While an embodiment of this disclosure includes the non-invasive exhaled breath measurement of NO, it is contemplated that other measurements of a patient's vital statistics could be incorporated as well. For example, an end-tidal carbon dioxide measurement, a blood lactic acid measurement, a pulse oximetry measurement, a respiratory rate, a heart rate, a blood pressure reading, a patient body temperature reading, or a cognitive assessment reading could be added to help ascertain the patient's risk for sepsis. Of these, preferred additional measurements include end tidal carbon dioxide, diastolic blood pressure, systolic blood pressure, respiratory rate, body temperature, pulse rate and oxygen saturation %. Such measurements could be incorporated into the device of this disclosure or otherwise collected by other devices and a scoring calculation made for identifying patients at greater or lesser risk for having sepsis, or identifying patients with sepsis as improving or worsening in condition. The most preferred additional measurement is body temperature, with a body temperature reading above about 100.4° F. or below about 96.8° F. being an indication of sepsis that is complimentary to a nitric oxide reading.

Figure 1:
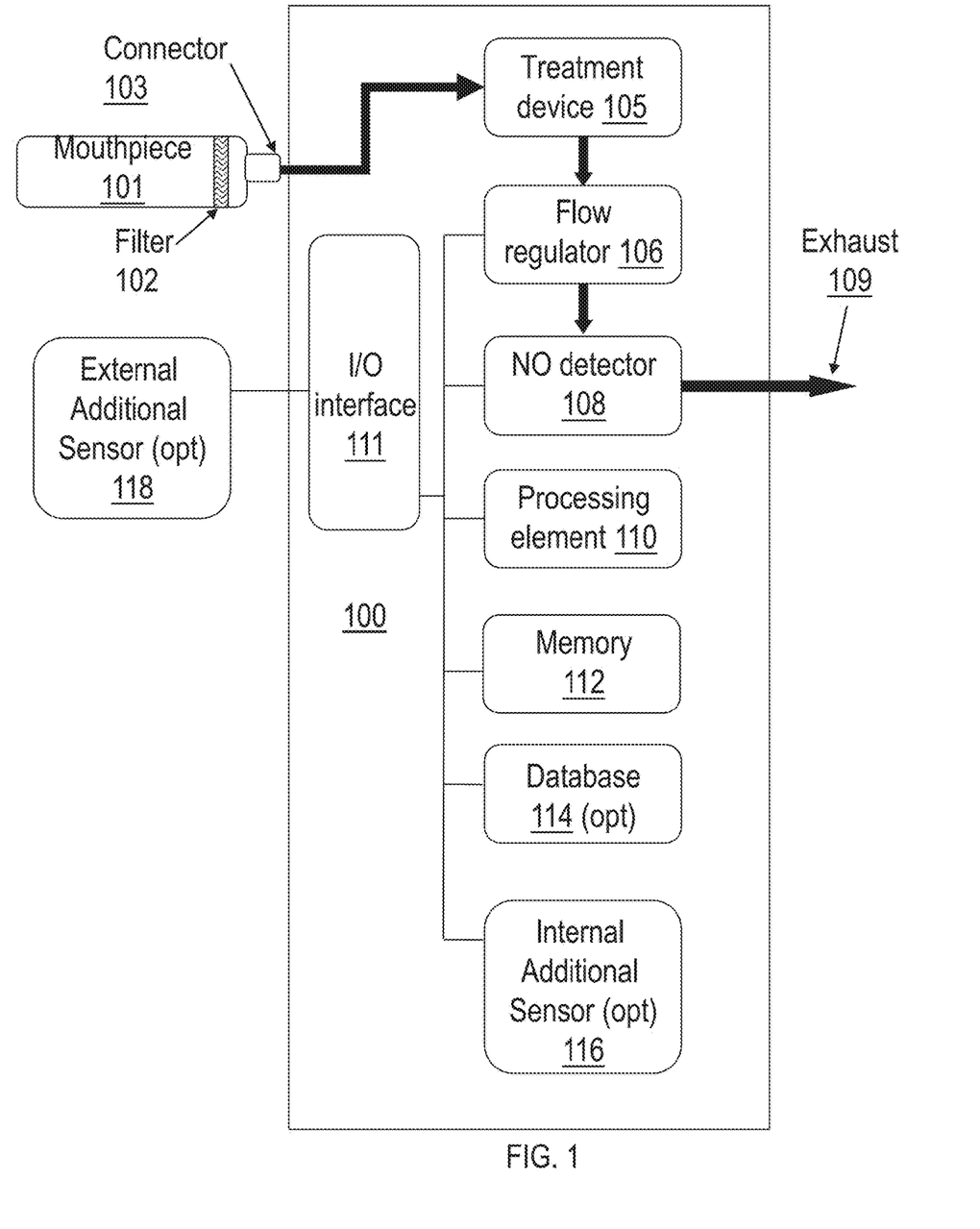
FIG. 1 is a schematic diagram of one embodiment of a sepsis diagnostic device.
Figure 2:
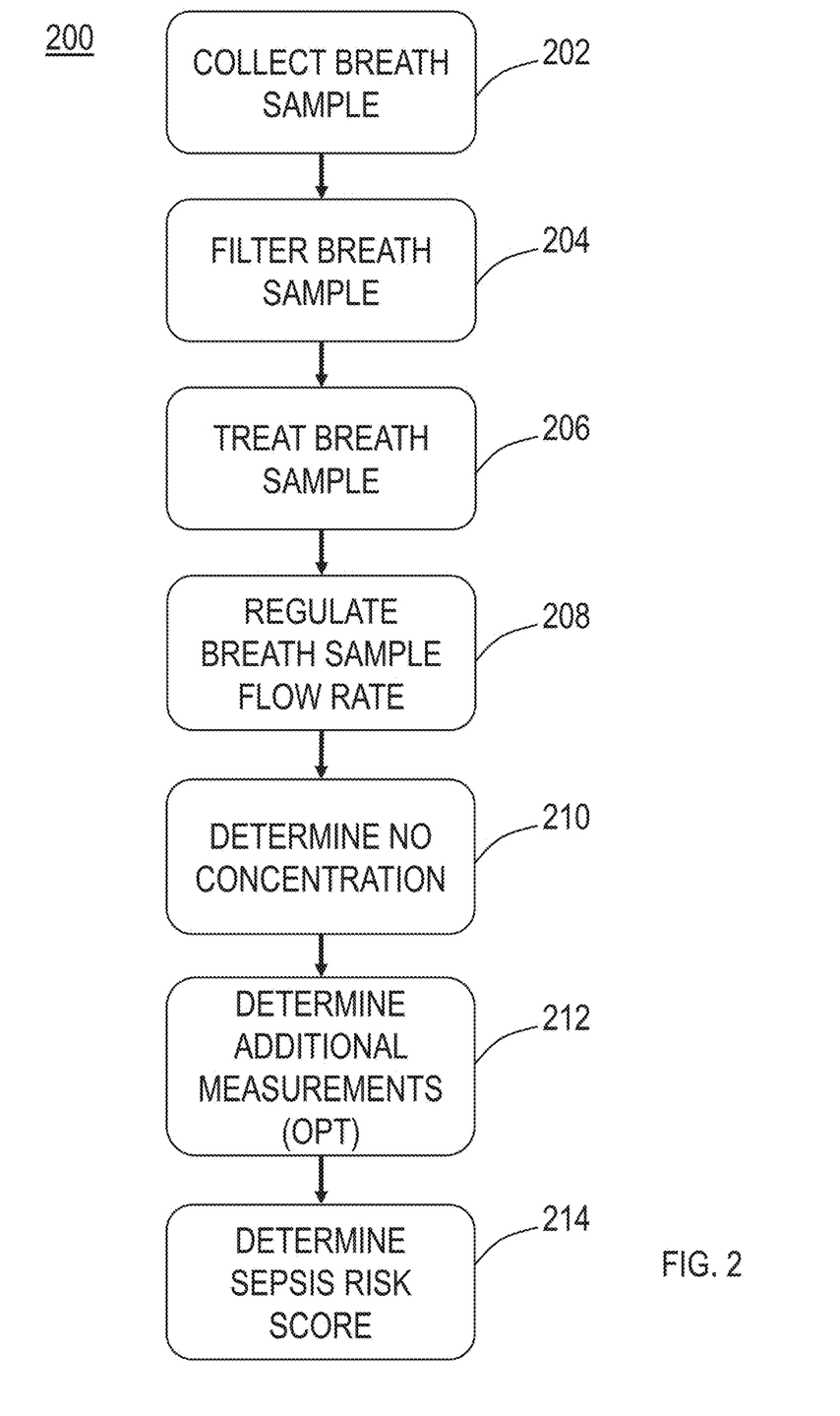
FIG. 2 is a schematic diagram of one method of determining a sepsis risk score using the device of FIG. 1.

FIG. 1 illustrates an embodiment of a sepsis assessment device 100 to assess sepsis risk according to the methods disclosed herein, for example by determining NO concentrations and optionally additional measurements of vital statistics that may increase the accuracy of a sepsis risk score. FIG. 2 illustrates a method 200 of assessing a patient's sepsis risk using exhaled NO concentrations with optional supplementary data. The method 200 may be executed on the sepsis assessment device 100. The method 200 may also be implemented independent of the sepsis assessment device 100. For example, the method 200 may be executed with discrete devices that measure NO and optionally devices that may take additional measurements, and the respective data may be inputted to a separate processing element to determine a sepsis risk score. Likewise, the sepsis assessment device 100 may execute methods different from or in addition to the method 200. The method 200 and the sepsis assessment device 100 are presented together for the sake of brevity but do not rely on one another.

Some or all of the components of the device 100 may be housed in a single integrated unit, or some or all of the components may be separate components in fluid and/or electrical communication with one another as described. The order in which the components of the sepsis assessment device 100 receive exhaled breath may vary from the order presented without departing from the present disclosure. The presented order is exemplary only, in order to facilitate understanding of the sepsis assessment device 100 and the methods of using it. Likewise the presented order of the operations of method 200 us exemplary only, and not limiting. Other orders of operation are contemplated and may be used without departing from the present disclosure.

The sepsis assessment device 100 includes or is in communication with at least a NO detector 108, as will be described in detail below. The sepsis assessment device 100 may optionally include, or be in communication with, an additional sensor 116 or 118 to detect additional measurements of patient vital data, such as an end-tidal carbon dioxide measurement, a blood lactic acid measurement, a pulse oximetry measurement, a respiratory rate, a heart rate, a blood pressure reading, a patient body temperature reading, or a cognitive assessment reading. In a preferred embodiment, the additional sensor 116 and/or 118 is a body temperature sensor. Any of these sensors or detectors may output a signal, such as an electrical signal correlated to the physical measurement made by the sensor or detector.

The one or more device processing elements 110 are substantially any type of electronic device capable of processing, receiving, and/or transmitting instructions. For example, the processing element 110 may be a microprocessor or a microcontroller, a central processing unit (CPU) a graphics processing unit (GPU), a field programmable gate array (FPGA), or an application specific integrated circuit (ASIC). Additionally or alternatively, select data processing steps or processes may be performed by one processing element 110 with other data processing steps performed by different processing elements 110, where the different processing elements 110 may or may not be in communication with each other.

The one or more memory components 112 may store electronic data used by the sepsis assessment device 100 to store instructions for the processing element 110, as well as to store data collected by NO detector 108, or additional detectors or sensors such as an internal temperature sensor 116 or external temperature sensor 118. In some examples, the one or more memory components 112 may be one or more magnetic hard disk drives, solid state drives, magneto optical memory, flash memory, electrically erasable programmable read-only memory ("EEPROM"), erasable programmable read-only memory ("EPROM"), ferromagnetic RAM, holographic memory, printed ferromagnetic memory, or non-volatile memory. In other examples, memory 112 may be any volatile computer readable media device that requires power to maintain its memory state. In one example, memory 112 is random access memory ("RAM"). Other examples may include dynamic RAM, and static RAM, or a combination of one or more types of memory components.

Optionally, the sepsis assessment device 100 may include a database 114. The database may be any type of collection of records of data relating exhaled NO concentrations to sepsis risk. In one embodiment, the sepsis assessment device 100 may be in communication with an external database 114, such as a database stored on a remote server. The sepsis assessment device 100 may communicate with the database 114 on the remote server through the I/O interface 111. In one embodiment, the database 114 includes information for previous patients having similar nitric oxide levels.

The I/O interface 111 provides communication to and from the sepsis assessment device 100 to exterior devices and/or users such as medical professionals. In one embodiment, the I/O interface is a display, such as a light emitting diode display, a liquid crystal display, cathode ray tube, plasma panel, ticker tape or other device that outputs data in a visual format. The I/O interface may include an annunciator, speaker or other auditory output. The I/O interface 111 may include one or more input buttons or sensors, a communication interface (such as Wi-Fi®, Ethernet, Bluetooth®, NFC, RFID, cellular, infrared or other optical communications, or the like), communication components (such as universal serial bus (USB) ports/cables), or the like. In various examples, the I/O interface 111 transmits sepsis risk scores, detector 108, body temperature sensor 116 and/or 118 data such as NO concentrations and body temperatures, or additional measurements. The I/O interface may receive data, such as biometric or demographic information about the patient (e.g., height, weight, age, blood pressure, pulse oxidation, pulse rate, race or ethnicity, socioeconomic status, or other information) that may be used in conjunction with NO data to determine a sepsis risk score. The I/O interface may communicate data to, or receive data from a remote computing device, such as a remote server. The I/O interface may also transmit data to a healthcare provider device such as a tablet, laptop, or desktop computer, or a user mobile device such as a smart phone. The sepsis assessment device 100 may record biometric or demographic information as well as information about exhaled NO concentrations, and sepsis diagnosis, severity and outcomes about patients to the database 114. The sepsis assessment device 100 may access such information to continually improve the accuracy of sepsis risk assessments.

The sepsis assessment device 100 may include a mouthpiece 101 adapted to collect the exhaled breath. The mouthpiece 101 may contain a filter 102. The mouthpiece 101 may be in fluid communication with a connector 103 that is also in fluid communication with a fluid input of the sepsis assessment device 100. The sepsis assessment device 100 may contain a treatment device 105 that receives the exhaled breath from the connector 103 and treats the exhaled breath to prepare it for further analysis. The treatment device 105 may pass the treated exhaled breath to a flow regulator 106. The flow regulator 106 may control the flow rate of the treated exhaled breath to other components of the sepsis assessment device 100 such as an NO detector or measurement device 108. The sepsis assessment device 100 may then exhaust the treated exhaled breath. One or more processing elements 110 and one or more memory components may be in electrical communication with any of the flow regulator 106, the NO detector 108 and the input/output (I/O) interface 111. The processing element 110 may read a NO reading from the NO detector 108 and determine a sepsis risk score. Optionally, the processing element 110 may read additional measurements from a supplementary sensor such as a body temperature sensor 116, 118. The processing element 110 may output the sepsis risk score to the I/O interface.

A body temperature sensor 116, 118 may be any suitable type of body temperature sensor known in the art. For example, the body temperature sensor 116, 118 may be a non-contact thermometer such as an infrared thermometer that reads a patient's skin or other temperature and correlates that reading to a body temperature. Alternately, or additionally, a body temperature sensor 116, 118 may be a contact-type thermometer such as a thermistor, resistance temperature detector, thermocouple, a phase change device such as a dot matrix thermometer, a semiconductor-based device, or even an analog bulb thermometer such as one filled with alcohol or mercury. A body temperature reading may be taken from a patient in any suitable location, such as the skin of the forehead or armpit, orally, rectally, aurally. A body temperature sensor 116 may be contained within a housing of the sepsis assessment device 100, such as a non-contact thermometer. Alternately or additionally, a body temperature sensor 118 may be an external device in communication with the sepsis assessment device 100 through either wired or wireless communication, either directly or through a network. When additional measurements such as body temperature are used in conjunction with a NO measurement, the processing element 110 may compare both the NO concentration and the additional measurements to thresholds to determine a sepsis risk score.

FIG. 2 illustrates a method 200 of determining a sepsis risk score according to the present disclosure. Alternately or additionally, the method of FIG. 2 may be used to investigate a patient's endothelial dysfunction. The method 200 may determine whether an underlying cause of the patient's endothelial dysfunction is related to sepsis, or to some other condition that can be associated with endothelial dysfunction, (e.g., as diabetes, hypertension, cardiovascular problems, or physical inactivity). The method 200 may begin with operation 202, where an exhaled breath sample is collected from a patient. The operation 202 may be executed by the sepsis assessment device 100. In one embodiment, the sepsis assessment device 100 may have a mouthpiece 101 that may be in fluid communication with the respiratory tract of a patient. In another embodiment, the mouthpiece 101 may be in fluid communication with a mechanical ventilator that is breathing for a patient. The mouthpiece 101 receives exhaled breath from the patient, either directly from the respiratory tract, or via a mechanical ventilator. The mouthpiece 101 is adapted to allow the passage of exhaled breath either from a patient's respiratory tract or a mechanical ventilator to the device 100. In another embodiment, the patient's exhaled breath is collected, such as with a collection bag or other container which is then sealed. The sealed collection bag may then be connected in fluid communication with the sepsis assessment device 100 to input and analyze the patient's NO level. The exhaled breath sample may be collected for a controlled duration, or at a controlled rate of exhalation.

The method 200 may proceed to operation 204 where the exhaled breath is filtered. Operation 204 may be executed by the filter 102. The mouthpiece 101 may have a filter 102 housed within it. The filter 102 may be a separate device in fluid communication with the mouthpiece 101. The filter 102 may be permanently housed within the mouthpiece 101, or it may be removable. The filter 102 may be adapted to remove particulate matter, moisture droplets, or the like from the exhaled breath before passing it to the connector 103.

The connector 103 may be in fluid communication with the mouthpiece 101 and/or the filter 102, and the device 100. The connector may be any type of suitable conduit that facilitates passage of exhaled breath from the mouthpiece 101 and/or filter 102 to the device 100. In various examples, the connector may be a tube, hose, pipe, duct, straw or other suitable structure adapted to pass exhaled breath from the mouthpiece 101 and/or the filter 102, to the device 100. In many embodiments, the mouthpiece 101, filter 102, and/or connector 103 may be replaceable and/or adaptable, such that the device 100 may be used by two or more different patients, or the same patient multiple times.

The method 200 may proceed to operation 206 where the exhaled breath is treated. A treatment device 105 may be used to execute operation 206. The treatment device 105 may receive exhaled breath from the connector 103. The treatment device 105 prepares the exhaled breath for further analysis. In one example, the treatment device 105 removes moisture from the exhaled breath. In various examples, the treatment device 105 may be a desiccant, a coalescing filter, a mechanical separator such as a cyclonic separator or screen, or any of these. The treatment device 105 may receive exhaled breath and output treated exhaled breath. The treatment device 105 may pass the treated exhaled breath to a flow regulator 106.

The method 200 may proceed to operation 208 where the flow rate of the treated exhaled breath is regulated. A flow regulator 106 may be used to execute operation 208. The flow regulator 106 may be any suitable device that can control the flow rate (either volumetric or mass flow), and/or pressure of the treated exhaled breath to downstream components of the sepsis assessment device 100. In various examples, the flow regulator may be a venturi, converging/diverging nozzle, an orifice, backpressure regulator, a forward pressure regulator, a mass flow controller, one or more valves and or actuators or biasing elements.

The method 200 may proceed to operation 210 where the NO concentration in the treated exhaled breath is determined. The sepsis assessment device 100 may contain or be in fluid communication with an NO detector 108. The NO detector 108 may be any suitable device that can detect a concentration or partial pressure of NO in the treated exhaled breath, and communicate a corresponding reading to the processing element 110 and/or the I/O interface 111. In one example, the NO sensor is a sensor that detects NO concentration by measuring an amount of light (e.g., infrared light) absorbed from a light beam passing through the treated exhaled breath and correlates that absorption to a concentration or partial pressure of NO in the treated exhaled breath. In various other examples, the NO detector 108 uses chemiluminescence or electrochemical methods to detect NO concentrations. The NO detector may output signals that correspond to the concentration of NO as controlled rate and/or end-tidal values. For example, the NO detector may output a signal corresponding to a controlled rate NO value and/or an end-tidal NO value.

The method 200 may proceed to operation 212 and additional patient measurements are taken. For example, additional measurements may include any one, or any combination, or the following additional measurements: an end-tidal carbon dioxide measurement, a blood lactic acid measurement, a pulse oximetry measurement, a respiratory rate, a heart rate, a blood pressure reading, a patient body temperature reading, or a cognitive assessment reading. Of these, preferred additional measurements include end tidal carbon dioxide, diastolic blood pressure, systolic blood pressure, respiratory rate, body temperature, pulse rate, and oxygen saturation %.

The method 200 may conclude with operation 214 where the sepsis risk score is determined and outputted. The one or more processing elements 110 may execute operation 214. The one or more processing elements 110 may be in electrical communication with the NO detector 108 and optionally the additional sensors 116, 118, either by wire wirelessly. The processing element 110 may receive electrical signals that correlate to a concentration or partial pressure of NO. The processing element 110 may determine a sepsis risk score from the NO concentration data.

The method 200, or portions of the method 200, may be repeated over time to determine changes in a patient's sepsis risk or condition. For example, the method 200 may be execute a first time to determine an initial sepsis risk score by determining an initial NO concentration in the patient's exhaled breath. Additional measurements of the patient's vital statistics as previously described, may be determined to establish initial values thereof, as well. The method 200 may be executed again at a later time to determine a subsequent exhaled NO concentration, or subsequent additional measurement of one or more vital statistics. Any of the subsequent NO concentration and/or subsequent vital statistics which may be used to determine a subsequent sepsis risk score. Operation 214 may include determining changes to the exhaled NO concentration, additional measurements, and/or the sepsis risk score. A level of endothelial dysfunction may be correlated to the NO concentration, which may be determined in operation 214.

In a specific example of executing the method 200 over time, the method 200 is executed initially to determine a first NO concentration S1, for instance in operation 210. A first additional measurement of a vital statistic may optionally be determined. The initial NO concentration S1 and the additional measurement, if taken, are stored in a memory, such as the memory 112. An initial sepsis risk score is determined based on the NO concentration, and optionally additionally based on the additional measurement if taken. At a later time, the method 200 is executed again, for example, in the patient's next breath, or after a certain time, such as 15 minutes or an hour later. When the method 200 is repeated, a second NO concentration S2 and optionally a second additional measurement are taken. The second NO concentration S2 and the second additional measurement, if taken, are stored in memory. An second sepsis risk score is determined based on the second NO concentration S2, and optionally additionally based on the second additional measurement if taken. A changed NO concentration $\Delta S$ may be determined by subtracting the second NO concentration S2 from the initial NO concentration S1 (e.g., $\Delta S=S1-S2$). A changed sepsis risk score $\Delta S$, based on a difference between the initial sepsis risk score S1 and the second sepsis risk S2, score may be determined. An improvement or a worsening of a sepsis condition in the patient may be determined, based on the changed sepsis risk score $\Delta S$.

Figure 4A:
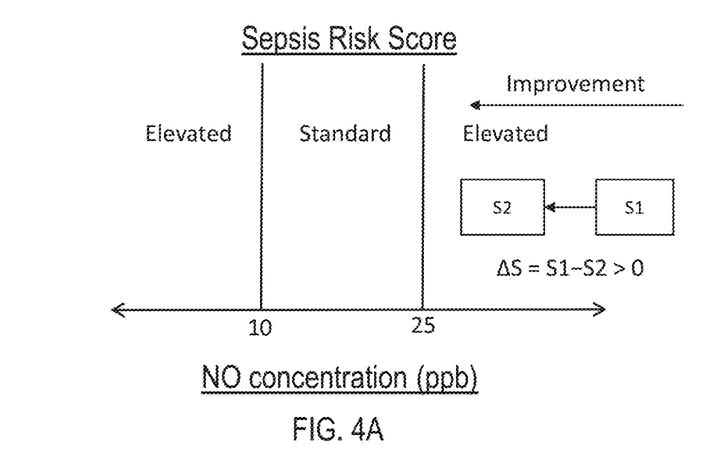
FIG. 4A is a graph of change in NO concentration showing an improvement in patient condition correlated to a positive change in NO concentration.
Figure 4B:
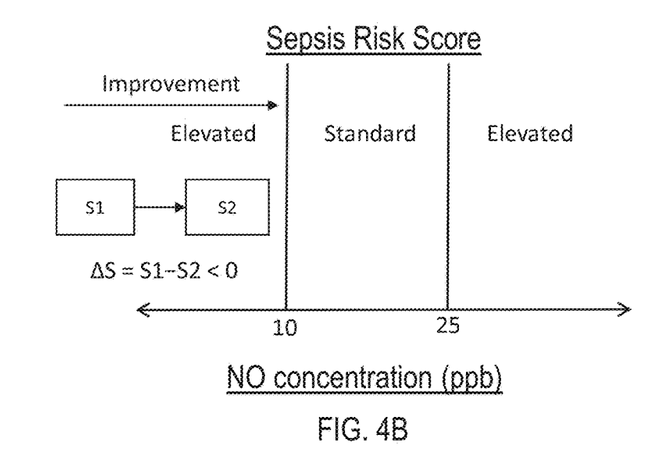
FIG. 4B is a graph of change in NO concentration showing an improvement in patient condition correlated to a negative change in NO concentration.

As shown in FIGS. 4A-4D, an improvement or worsening of a patient's sepsis condition may be correlated to positive or negative changes in NO concentration as reflected in the $\Delta S$. For example, as shown in FIG. 4A, an initial NO concentration, S1, may be obtained. Later, a second NO concentration, S2, may be obtained. As shown in FIG. 4A, an improvement in the patient's sepsis condition may be correlated to a positive $\Delta S$ (i.e., $\Delta S=S1-S2>0$) when the initial NO concentration, S1, is greater than 25 and the second NO concentration S2 is less than S1. Likewise, referring to FIG. 4B, an improvement in the patient's sepsis condition may be correlated to a negative $\Delta S$ (i.e., $\Delta S=S1-S2<0$) when the initial NO concentration S1 is below about 10 ppb and the second NO concentration S2 is above S1. In other words, an improvement in a sepsis condition may be correlated to movement of the NO concentration toward a normal NO concentration for a healthy person, e.g., when S2 is closer to the NO concentration interval of about 10-25 ppb than S1.

Figure 4C:
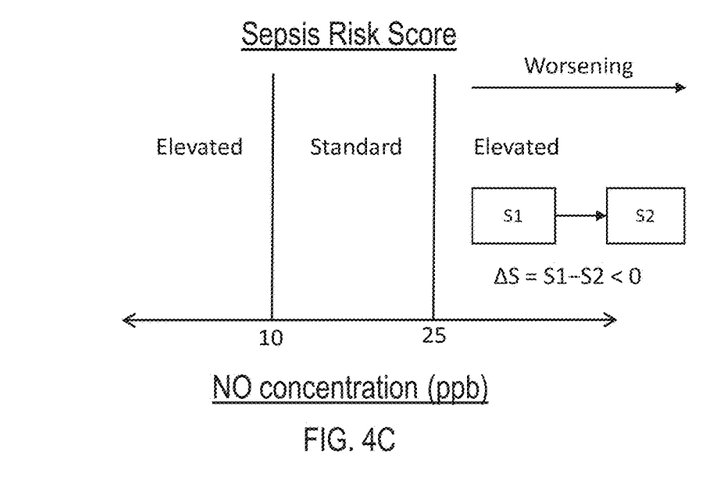
FIG. 4C is a graph of change in NO concentration showing a worsening in patient condition correlated to a negative change in NO concentration.
Figure 4D:
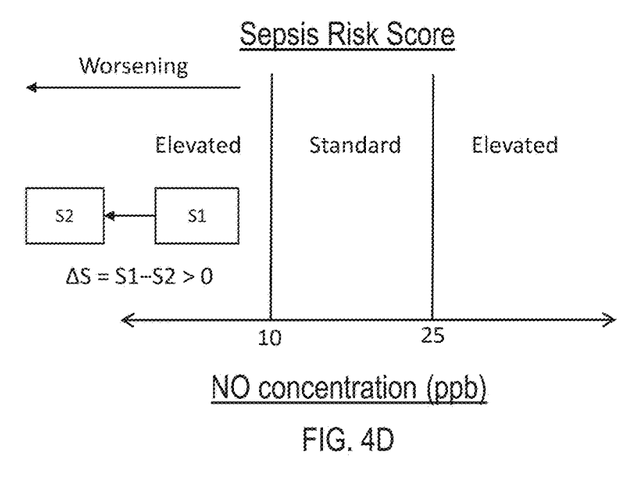
FIG. 4D is a graph of change in NO concentration showing a worsening in patient condition correlated to a positive change in NO concentration.

Likewise, as shown for example in FIG. 4C, a worsening in the patient's sepsis condition may be correlated to a negative $\Delta S$ (i.e., $\Delta S=S1-S2<0$) when the NO concentration is above about 25 ppb and the second NO concentration S2 is above S1. As shown for example in FIG. 4D, a worsening in the patient's sepsis condition may be correlated to a positive $\Delta S$ (i.e., $\Delta S=S1-S2>0$) when the initial NO concentration S1 is below about 10 ppb and the second NO concentration S2 is less than S1. In other words, a worsening in a sepsis condition may be correlated to movement of the NO concentration away from a normal NO concentration for a healthy person, e.g., when S2 is further from the NO concentration interval of about 10-25 ppb than S1.

Figure 3:
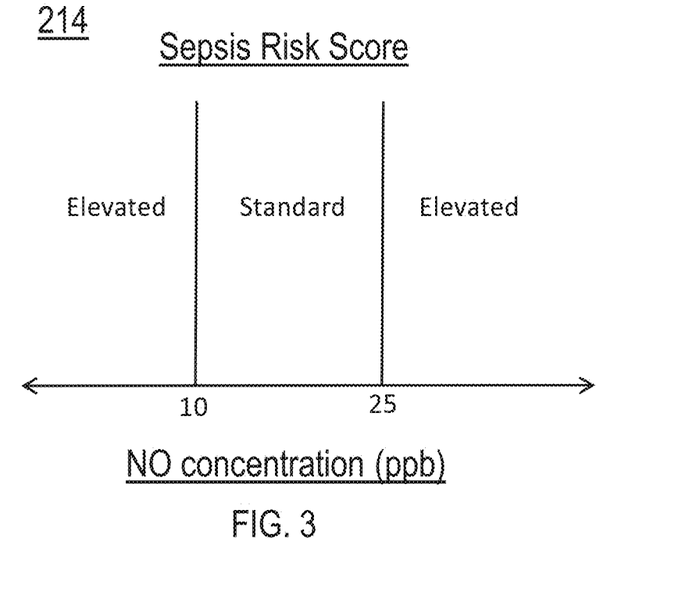
FIG. 3 is a graph of NO concentration showing Risk Score of having or developing sepsis.

FIG. 3 illustrates one embodiment of operation 214 for determining a sepsis risk score. In the embodiment, a NO concentration detected in a patient's exhaled breath below a measurement threshold of about 10 ppb or above a measurement threshold of about 25 ppb is indicative of an elevated risk of having or developing sepsis.

Figure 5:
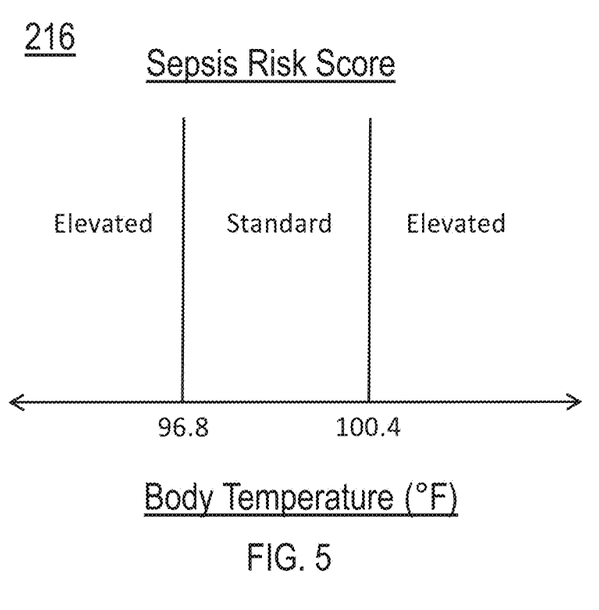
FIG. 5 is a graph of body temperature showing Risk Score of having or developing sepsis.

FIG. 5 illustrates another embodiment of operation 214, operation 216, for determining a sepsis risk score. In the embodiment, a body temperature below a measurement threshold of about 96.8° F. or above a measurement threshold of about 100.4° F. is indicative of an elevated risk of having or developing sepsis.

Figure 6:
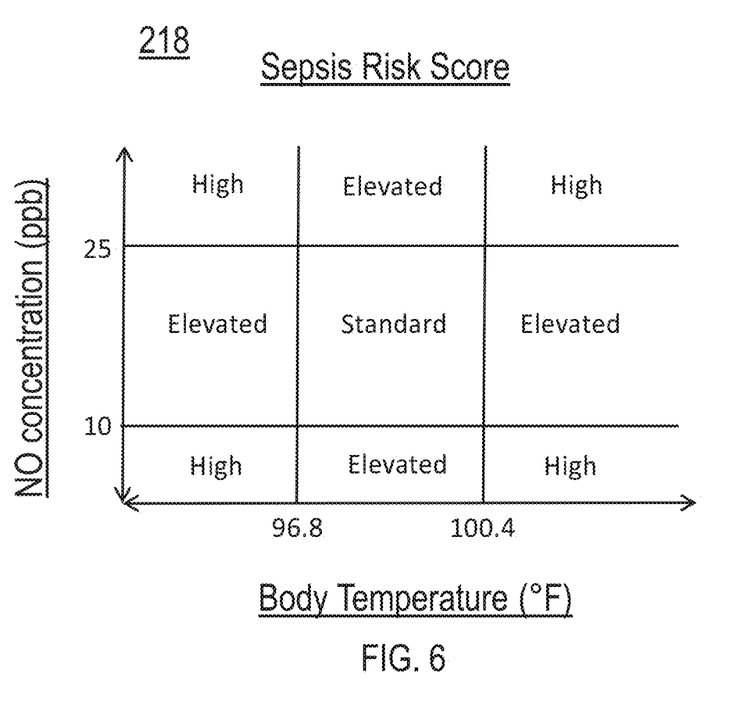
FIG. 6 is a graph showing Risk Score of having or developing sepsis based on NO concentration supplemented with body temperature.

FIG. 6 illustrates another embodiment of operation 214, operation 218, for determining a sepsis risk score. In the embodiment, NO concentration in exhaled breath and a patient's body temperature are used together to assess sepsis risk. As with the embodiments of FIG. 3 and/or FIG. 5 a NO concentration detected in a patient's exhaled breath below about 10 ppb or above about 25 ppb is indicative of an elevated risk of having or developing sepsis and a body temperature below about 96.8° F. or above about 100.4° F. is indicative of an elevated risk of having or developing sepsis. In the embodiment, a NO concentration below about 10 ppb and a body temperature below about 96.8° F. are indicative of a high risk of having or developing sepsis. A NO concentration below about 10 ppb and a body temperature above about 100.4° F. are indicative of a high risk of having or developing sepsis. A NO concentration above about 25 ppb and a body temperature above about 100.4° F. are indicative of a high risk of having or developing sepsis. A NO concentration above about 25 ppb and a body temperature below about 96.8° F. are indicative of a high risk of having or developing sepsis. In other embodiments, NO concentration may be augmented with one or more additional measurements such as end-tidal carbon dioxide measurement, a blood lactic acid measurement, a pulse oximetry measurement, a respiratory rate, a heart rate, a blood pressure reading, a patient body temperature reading, or a cognitive assessment reading. Using such additional measurement may have the technical advantage of enhancing accuracy of a sepsis risk score.

Any of the temperature and/or NO measurement thresholds disclosed herein are subject to normal variations as may be experienced when assessing patients of various ages, genders, ethnicities, body mass indexes, or with other lifestyle factors such as smoking.

The disclosed methods and devices may be used to assess a patient that is conscious or unconscious. In most embodiments, the patient is conscious when NO values are determined. In most embodiments, a patient may be assessed at any stage of sepsis, for example from early stage sepsis, for example where the patient may present with a fever and/or increased heart rate, to septic shock. In most cases, a patient in an early sepsis stage will not require mechanical ventilation. Assessment at this stage may also allow for early treatment of a sepsis diagnosis with antibiotic treatment. In some cases, when a patient is in early stage of sepsis, the patient is conscious and may be better able to exhale in a controlled pattern that is different from a normal breath exhale. Those skilled in the art will recognize the utility of the disclosed methods and devices for use with patients of more advanced stage sepsis, for example those patients requiring mechanical ventilation.

One feature of this disclosure relates to how individual test results can be correlated to a sepsis diagnosis. Information from the sepsis assessment device 100 is intended to alert clinicians as to whether there is a need to quickly, and how aggressively, treat the patient for sepsis. In most cases, a diagnosis of sepsis from the disclosed devices and methods may likely result in treating the patient with one or more antibiotics. Information from this disclosure may also inform clinicians as to the risk this patient may have for developing severe sepsis or going into septic shock. Thus, results such as a sepsis risk score resulting from the disclosed methods and devices, may be used to develop treatment plans or regimes for the patient. In various examples, if the sepsis risk score is high, the score may be used to develop a more aggressive treatment regime, for example one or more of transfer to an intensive care unit, intravenous delivery of antibiotics, intravenous delivery of fluids, high dose antibiotics, broad spectrum antibiotics, oxygen therapy, etc. The described methods may indicate a patient has or is at risk of sepsis based on analyzing and measuring an exhaled breath NO measurement. Assessing values for NO concentration in exhaled breath of a patient, and/or optionally additional measurements such as body temperature, may aid in providing a risk score for the patient developing sepsis in the future if the patient is not treated for a bacterial infection. In many embodiments, the risk score may be represented by a percentage value, for example a value between 0 and 100. The percentage value may correspond to a probability that the patient has, or may develop, sepsis. In some embodiments, a patient whose NO concentration in exhaled breath, or additional measurements, indicate a low risk of imminent sepsis, the risk score value may be less than about 10. Those skilled in the art would recognize a low risk score would allow time for additional more confirmatory testing for infection or to defer antibiotic or blood filtration treatment.

It is also contemplated that the devices and methods of this disclosure incorporates an improved method for interpreting results. For example, an embodiment of this disclosure is includes an algorithm to output a percent risk that a patient has sepsis based on previous clinical trial results for that segment of patients having similar NO or additional measurements.

The disclosed devices and methods aid in diagnosing sepsis in a patient that may have sepsis or be at risk for developing sepsis. For example, results from this method may predict the likelihood that a given patient may have microbiologically confirmed sepsis and/or determine the risk that a given patient may be on a course that may lead to septic shock.

The disclosed methods and devices may be used to assess a patient who is conscious or unconscious. In most embodiments, the patient is conscious when NO exhaled breath concentrations are determined. In most embodiments, a patient may be assessed at any stage of sepsis, for example from early stage sepsis where the patient may present with a fever and/or increased heart rate, to septic shock where organ failure is imminent or present. In most cases, a patient in an early sepsis stage may not require mechanical ventilation. Assessment at this stage may also allow for early treatment of a sepsis diagnosis with antibiotic treatment. In some cases, when a patient is in early stage of sepsis, the patient is conscious and may be better able to exhale in a controlled pattern that is different from a normal breath exhale. Those skilled in the art may recognize the utility of the disclosed methods and devices for use with patients of more advanced stage sepsis, for example those patients requiring mechanical ventilation.

It is also contemplated that the methods and devices of this disclosure can be used to monitor patients for worsening or improving conditions as they relate to sepsis. When used for this purpose, multiple readings are taken over time to determine if a sepsis patient's nitric oxide concentrations are trending toward (e.g. improving) or away from (e.g. worsening) concentrations of nitric oxide that are associated with a healthy normal range.

EXAMPLES

An Institutional Review Board approved clinical study was conducted to evaluate the measurements of nitric oxide alone and combined with other non-invasive tests as a screening tool to quickly and reliably determine whether patients had sepsis. A total of sixteen healthy volunteer controls were tested, along with sixteen patients who entered into a hospital emergency department with suspected sepsis and meeting Systemic Inflammatory Response Syndrome screening criteria for likelihood of having sepsis. All sixteen patients were entered into treatment for sepsis.

Patients enrolled into the program were tested for nitric oxide in exhaled breath and body temperature either before or very early in their sepsis treatment regimen (~first hour). Patients were monitored over the course of hospitalization. During this hospitalization stay, confirmatory tests such as microbiological blood testing were made, and full physician recommended assessments were used to create a final diagnosis. For the purpose of this study, patients were validated as actually having sepsis using physician sepsis diagnosis on the final patient chart.

Observations

Healthy volunteers averaged 22.6 ppb nitric oxide with a standard deviation of 9.97 ppb.

The lowest nitric oxide concentration measured in healthy volunteers was 12 ppb.

Only six of the sixteen patients enrolled into the hospital sepsis treatment program were later determined to actually have had sepsis. The remaining ten were ultimately diagnosed with conditions other than sepsis.

Five of the six patients diagnosed with sepsis had unusually high (defined as 26 ppb or higher) or unusually low (defined as 9 ppb or lower) nitric oxide concentration in exhaled breath. The one patient with a sepsis diagnosis and a nitric oxide reading between 9 ppb and 26 ppb was later determined to be on a medication that is believed to affect nitric oxide readings (albuterol).

Nitric oxide and body temperature measurements were determined to have useful complimentary benefits in separating patients who had sepsis from those who did not. In one example of the disclosed method, an algorithm was developed to create an aggregate score of temperature and nitric oxide measurements by assigning weighting scores to measurements of NO and body temperature above or below measurement thresholds. For example, for nitric oxide, 3 weighting points were assigned for patients having nitric oxide concentrations of 26 ppb or higher OR lower than 10 ppb. For body temperature, 4 weighting points were assigned for patient temperatures above 100.4° F. and 1 weighting point was assigned for patient body temperature below 96.8° F. Weighting points were totaled into a final score and ranged in all patients from 0 to 7 points. A summary is provided in FIG. 7.

Other suitable methods of assessing sepsis risk are contemplated, including other numeric weightings of NO and other vital statistics such as body temperature. For example, higher weightings may be assigned to NO concentrations that are above or below measurement thresholds that weightings for other vital statistics that are above or below other respective measurement thresholds. Any reading for NO or any other vital statistic may be assigned asymmetric weightings for readings above or below measurement thresholds.

For example, a body of temperature below a threshold may be assigned a first weighting value and a body temperature above another threshold may be assigned a second value different than (i.e., above or below) the first value, such as the example of weighing the patient body temperature described above. In other examples, weighting values may be symmetric. For example, a NO measurement above a measurement threshold may be assigned the same weighting value as a measurement below another threshold, such as in the example of weighting the patient NO concentration described above.

In some examples, a weighting may change based on a difference between a vital statistic measurement and a measurement threshold. For example, as body temperature increases above a measurement threshold, the weighting may increase. In a specific example, if a measurement threshold of body temperature is 100.4° F., a patient with a body temperature above 100.4° F. may be assigned a weighting score that increases linearly with the difference between the body temperature measurement and the threshold. Weightings based on a difference between a vital statistic measurement and a measurement threshold may vary linearly, non-linearly (e.g., exponentially, logarithmically, or the like), continuously, or discontinuously (e.g., a step function).

Figure 7:
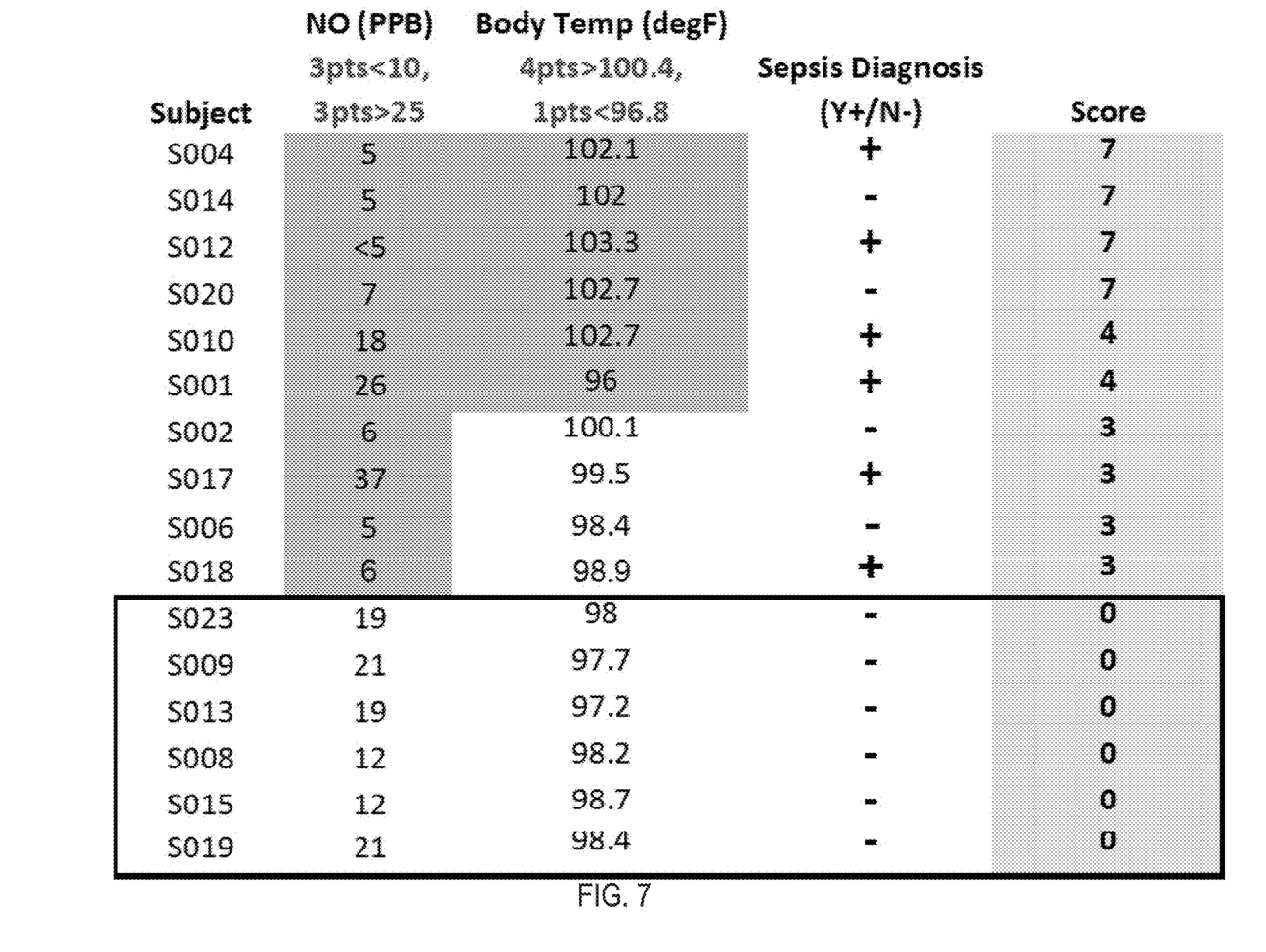
FIG. 7 is a table showing an example of clinical results using a Sepsis Risk Score to assess sepsis risk in patients.

As shown in FIG. 7, all six patients with scores below 3 points did not have sepsis, as diagnosed by a physician. All patients diagnosed with sepsis had scores of 3 or higher.

We conclude that nitric oxide and body temperature measurements together can be used as a screening tool to 1) more reliably determine which patients have sepsis, and 2) more reliably determine those who don't have sepsis so as to avoid unnecessary costs, treatments and side effects. Future studies should exclude patients on albuterol as nitric oxide results may be adversely affected by that drug.

While multiple embodiments are disclosed, still other embodiments of the present disclosure may become apparent to those skilled in the art from the following detailed description. As may be apparent, the disclosure is capable of modifications in various obvious aspects, all without departing from the spirit and scope of the present disclosure. Accordingly, the detailed description is to be regarded as illustrative in nature and not restrictive.

All references disclosed herein, whether patent or non-patent, are hereby incorporated by reference as if each was included at its citation, in its entirety. In case of conflict between reference and specification, the present specification, including definitions, may control.

Although the present disclosure has been described with a certain degree of particularity, it is understood the disclosure has been made by way of example, and changes in detail or structure may be made without departing from the spirit of the disclosure as defined in the appended claims.

We claim:

1. A method for non-invasively determining a sepsis risk score of and treating a patient comprising:
controlling, via a flow regulator, a rate of exhalation from a patient;
analyzing an exhaled breath sample collected at the controlled rate of exhalation;
determining an end tidal nitric oxide (NO) concentration in the exhaled breath sample;
determining a sepsis risk score correlated to the end tidal NO concentration, wherein in response to the end tidal NO concentration having a value lower than 13 ppb the end tidal NO concentration is correlated to an elevated sepsis risk score indicative of the patient having or developing systemic sepsis; and
treating the patient having an elevated sepsis risk score.

2. The method of claim 1, wherein the exhaled breath sample is collected at the controlled rate of exhalation is a rate between and including 20 mL/sec and 50 mL/sec.

3. The method of claim 2, wherein the controlled rate of exhalation is 50 mL/sec.

4. The method of claim 1, further comprising:
determining additional measurements of vital statistics of the patient comprising respiratory rate, pulse rate, and body temperature; and
determining the sepsis risk score further based on the additional measurements.

5. The method of claim 4 further comprising:
collecting a second exhaled breath sample at a time after collecting the exhaled breath sample;
determining a second end tidal NO concentration in the second exhaled breath sample;
determining a second additional measurement of the vital statistic of the patient; and
determining a second sepsis risk score correlated to the second end tidal NO concentration and the second additional measurement.

6. The method of claim 4, wherein:
the vital statistic is a body temperature of the patient; and
a body temperature below 96.8° F. or above 100.4° F. is indicative of an elevated risk of systemic sepsis.

7. The method of claim 1 further comprising:
collecting a second exhaled breath sample at a time after collecting the exhaled breath sample; and
determining a second end tidal NO concentration in the second exhaled breath sample;
determining a second sepsis risk score correlated to the second end tidal NO concentration.

8. The method of claim 7 further comprising:
determining a changed sepsis risk score based on a difference between the sepsis risk score and the second sepsis risk score; and
determining an improvement or a worsening of a systemic sepsis condition in the patient based on the changed sepsis risk score.

9. The method of claim 7, further comprising:
determining a changed end tidal NO concentration by subtracting the second end tidal NO concentration from the end tidal NO concentration.

10. The method of claim 9, wherein an improvement in a systemic sepsis condition in the patient is correlated to a negative value resulting from subtracting the second end tidal NO concentration from the end tidal NO concentration.

11. The method of claim 9, wherein an improvement in a systemic sepsis condition in the patient is correlated to a positive changed end tidal NO concentration when at least one of the end tidal NO concentration or the second end tidal NO concentration is above 25 ppb.

12. The method of claim 1, further comprising:
determining the patient suffers from endothelial dysfunction in response to the end tidal NO concentration having a value less than 10 ppb.

13. The method of claim 12 further comprising:
collecting a second exhaled breath sample at a time after collecting the exhaled breath sample;
determining a second end tidal NO concentration in the second exhaled breath sample;
determining a changed end tidal NO concentration by subtracting the second end tidal NO concentration from the end tidal NO concentration; and determining an improvement or a worsening of the endothelial dysfunction in the patient based on the changed end tidal NO concentration.

14. The method of claim 13, wherein the improvement of the endothelial dysfunction is correlated to a positive changed end tidal NO concentration.

15. The method of claim 13, wherein the worsening of the endothelial dysfunction is correlated to a negative changed end tidal NO concentration.

16. The method of claim 13, wherein the improvement is correlated to a negative changed end tidal NO concentration.

17. The method of claim 13, wherein the worsening is correlated to a positive changed end tidal NO concentration.

18. The method of claim 12, further comprising:
determining the endothelial dysfunction is related to one or more of a systemic sepsis condition, diabetes, hypertension, cardiovascular problems, or physical inactivity.

19. A method for non-invasively determining a sepsis risk score of and treating a patient comprising:
controlling, via a flow regulator, a first rate of exhalation from a patient;
collecting an exhaled breath sample at the first controlled rate of exhalation of 50 mL/sec;
determining an end tidal nitric oxide (NO) concentration in the exhaled breath sample;
determining a first sepsis risk score correlated to the end tidal NO concentration, wherein in response to the end tidal NO concentration having a value lower than 10 ppb the first sepsis risk score is an elevated sepsis risk score and indicative of the patient having or developing systemic sepsis;
weighting the first sepsis risk score by additional measurements of one or more vital statistics of the patient, the vital statistics including a body temperature of the patient;
controlling, via the flow regulator, a second rate of exhalation from a patient;
collecting a second exhaled breath sample at a time after collecting the exhaled breath sample, the second exhaled breath collected at the second controlled rate of exhalation of 50 mL/sec;
determining a second end tidal NO concentration in the second exhaled breath sample;
determining a second sepsis risk score correlated to the second end tidal NO concentration;
weighting the second sepsis risk score by a second measurement of the one or more vital statistics of the patient;
determining a changed sepsis risk score based on a difference between the first sepsis risk score and the second sepsis risk score; and
determining an improvement or a worsening of a systemic sepsis condition in the patient based on the changed sepsis risk score; and
treating the patient based on the changed sepsis risk score.

20. The method of claim 1, wherein the end tidal NO concentration having the value lower than 13 ppb is lower than 10 ppb.

21. The method of claim 1, wherein the elevated sepsis risk score is indicative of a high risk of the patient having or developing systemic sepsis.

22. The method of claim 1, wherein the end tidal NO concentration having a value below 13 ppb comprises a value having a range of inclusive values from 4-6 ppb, the end tidal NO concentration is correlated to an elevated sepsis risk score indicative of the patient having or developing systemic sepsis.

23. The method of claim 1, wherein the end tidal NO concentration having a value below 13 ppb comprises a value having a value lower than 4 ppb, the end tidal NO concentration is correlated to an elevated sepsis risk score indicative of the patient having or developing systemic sepsis.

24. A method for non-invasively determining a sepsis risk score of and treating a patient comprising:
collecting an exhaled breath sample from the patient, wherein:
the exhaled breath sample is collected at a controlled rate, and
the controlled rate is independent of an inlet pressure of the exhaled breath sample, and
the controlled rate is less than or equal to 50 mL/sec;
determining an end tidal nitric oxide (NO) concentration in the exhaled breath sample;
receiving a body temperature of the patient;
based on the end tidal NO concentration and the body temperature, determining a sepsis risk score for the patient, wherein in response to the end tidal NO concentration having a value lower than 4 ppb and a body temperature either lower than 96.8 deg F or greater than 100.4 deg F an elevated sepsis risk score is established that is indicative of the patient having or developing systemic sepsis; and
treating the patient having the elevated sepsis risk score for infection.

\* \* \* \* \*